(12) United States Patent
Hiroshima et al.

(10) Patent No.: US 8,506,216 B2
(45) Date of Patent: Aug. 13, 2013

(54) HORIZONTAL MACHINE TOOL (75) Inventors: Koji Hiroshima, Nanto (JP); Muneyoshi Horii, Nanto (JP); Shiro Murai, Nanto (JP)

(73) Assignee: Komatsu NTC Ltd., Nanto, Toyama (JP)

( * ) Notice: Subject to any disclaimer, the term of this patent is extended or adjusted under 35 U.S.C. 154(b) by 122 days.

(21) Appl. No.: 13/258,767

(22) PCT Filed: Mar. 12, 2010

(86) PCT No.: PCT/JP2010/054227
§ 371 (c)(1),
(2), (4) Date: Sep. 22, 2011

(87) PCT Pub. No.: WO2010/113617
PCT Pub. Date: Oct. 7, 2010

(65) Prior Publication Data
US 2012/0020755 A1 Jan. 26, 2012

(30) Foreign Application Priority Data
Mar. 31, 2009 (JP) .................................. 2009-084039

(51) Int. Cl.
*B23C 1/027* (2006.01)
*B23Q 1/26* (2006.01)

(52) U.S. Cl.
USPC ........................... 409/235; 409/212; 409/191

(58) Field of Classification Search
USPC .................. 409/235, 202, 212, 191; 408/234
See application file for complete search history.

(56) References Cited

U.S. PATENT DOCUMENTS

| 3,752,596 | A | * | 8/1973 | Weyand et al. | 409/235 |
| 4,649,610 | A | * | 3/1987 | Onishi et al. | 483/67 |
| 4,768,282 | A | * | 9/1988 | Rieck et al. | 483/1 |
| 4,856,752 | A | * | 8/1989 | Linn | 248/678 |
| 6,582,278 | B1 | * | 6/2003 | Kroll et al. | 409/235 |
| 6,623,222 | B1 | * | 9/2003 | Kroll et al. | 409/235 |

(Continued)

FOREIGN PATENT DOCUMENTS

CN 1481292 A 3/2004
CN 1482957 A 3/2004

(Continued)

OTHER PUBLICATIONS

International Search Report for corresponding International Patent Application No. PCT/JP2010/054227 mailed Jun. 8, 2010.

(Continued)

*Primary Examiner* — Erica E Cadugan
(74) *Attorney, Agent, or Firm* — Merchant & Gould P.C.

(57) ABSTRACT

A horizontal machine tool (1) includes a base frame (10) where workpiece support faces (11c) for supporting a workpiece are formed at front portions; an X-axis saddle (20) attached to a back-face portion (12b) of the base frame (10) through an X-axis movement mechanism (50) universally slidably in a left-right direction; a Y-axis saddle (30) attached to the X-axis saddle (20) through a Y-axis movement mechanism (60) universally slidably in an up-down direction; and a spindle device (40) attached to the Y-axis saddle (30) through a Z-axis movement mechanism (70) universally slidably in a front-rear direction. According to this configuration, it is possible to make a whole of the horizontal machine tool a small size and lightweight and to enhance machining accuracy of the workpiece.

5 Claims, 4 Drawing Sheets

(56) References Cited

U.S. PATENT DOCUMENTS

| | | | |
|---|---|---|---|
| 7,189,194 B1 * | 3/2007 | Takayama et al. | 483/39 |
| 2001/0041651 A1 | 11/2001 | Abe et al. | |
| 2003/0126728 A1 * | 7/2003 | Watanabe | 29/48.5 R |
| 2004/0077470 A1 * | 4/2004 | Camozzi et al. | 483/31 |
| 2004/0140721 A1 * | 7/2004 | Chang et al. | 409/232 |
| 2005/0031425 A1 | 2/2005 | Hiramoto et al. | |
| 2006/0153653 A1 * | 7/2006 | Lu et al. | 409/235 |
| 2012/0245005 A1 * | 9/2012 | Sharma et al. | 483/1 |

FOREIGN PATENT DOCUMENTS

| | | | |
|---|---|---|---|
| CN | 1803395 A | | 7/2006 |
| CN | 2794727 Y | | 7/2006 |
| GB | 836310 A | * | 6/1960 |
| JP | 10-180593 A | * | 7/1998 |
| JP | 10-191617 A | * | 7/1998 |
| JP | 10-263960 A | * | 10/1998 |
| JP | 10-315077 A | * | 12/1998 |
| JP | 11-099424 A | | 4/1999 |
| JP | 2002-079431 A | | 3/2002 |
| JP | 2002-126959 A | * | 5/2002 |
| JP | 2002-137128 A | * | 5/2002 |
| JP | 2005-342816 A | | 12/2005 |
| JP | 2006-150576 A | | 6/2006 |

OTHER PUBLICATIONS

Chinese Office Action for corresponding application No. 201080012223.X mailed Apr. 2, 2013.

* cited by examiner

HORIZONTAL MACHINE TOOL

This application is a National Stage Application of PCT/JP2010/054227, filed 12 Mar. 2010, which claims benefit of Serial No. 2009-084039, filed 31 Mar. 2009 in Japan and which applications are incorporated herein by reference. To the extent appropriate, a claim of priority is made to each of the above disclosed applications.

TECHNICAL FIELD

The present invention relates to a horizontal machine tool.

BACKGROUND ART

As a horizontal machine tool, there is the tool comprising: a bed where a workpiece support face for supporting a workpiece is formed at an upper-face front portion; a column attached to an upper-face rear portion of the bed universally slidably in a front-rear direction (Z-axis direction) and a left-right direction (X-axis direction); and a spindle device attached to the column universally slidably in an up-down direction (Y-axis direction) (for example, see a patent document 1).

According to such a horizontal machine tool, by attaching a tool to a spindle of a spindle device and by moving the spindle device in three-axial directions with respect to a workpiece placed at a workpiece support face of a bed, it is possible to cut the workpiece.

PRIOR ART DOCUMENT

Patent Document

Patent document 1: Japanese Patent Laid-Open Publication No. 2005-342816 (paragraph 0012, FIG. 1)

SUMMARY OF THE INVENTION

Problems to be Solved by the Invention

In the aforementioned conventional horizontal machine tool, because a movement mechanism of the column is provided at the upper-face rear portion of the bed, and an upper face of the bed is large in the front-rear direction, a whole of the horizontal machine tool is a large-size. Furthermore, because a distance from the workpiece support face to the movement mechanism of the column is long, dimensional change generated between the workpiece support face and the spindle device is large due to a heat expansion of the bed, and machining accuracy of a workpiece is low.

Means for Solving the Problem

In order to solve the problem, the present invention is a horizontal machine tool comprising: a base frame where workpiece support faces for supporting a workpiece are formed at front portions; an X-axis saddle attached to a back-face portion of the base frame through an X-axis movement mechanism universally slidably in a left-right direction; a Y-axis saddle attached to the X-axis saddle through a Y-axis movement mechanism universally slidably in an up-down direction; and a spindle device attached to the Y-axis saddle through a Z-axis movement mechanism universally slidably in a front-rear direction.

According to this configuration, because it is possible to make an upper-face portion of the base frame small in the font-rear direction by providing movement mechanisms of the spindle device on the back-face portion of the base frame, it is possible to make the base frame a small size, and to make a whole of the horizontal machine tool a small size and lightweight.

Furthermore, the base frame is made a small size and distances from the workpiece support faces to the movement mechanisms are shortened; thereby, dimensional change generated between the workpiece support faces and the spindle device due to a heat expansion of the base frame is small; therefore, it is possible to enhance machining accuracy of a workpiece.

With respect to the horizontal machine tool, in the X-axis saddle is formed an opening penetrated in the front-rear direction; to a back-face portion of the X-axis saddle is attached the Y-axis saddle through the Y-axis movement mechanism; to an upper-face portion of the Y-axis saddle is attached the spindle device through the Z-axis movement mechanism; and it is possible to configure the spindle device so as to pass through the opening of the X-axis saddle and to be able to protrude more forward than the X-axis saddle.

According to this configuration, the horizontal machine tool of an L-shape in a side view thereof is configured, wherein the tool comprises a horizontal portion from the workpiece support faces of the base frame to the X-axis saddle attached to the back-face portion of the base frame; and a vertical portion from the X-axis saddle to the spindle device. Thus by combining main components of the horizontal machine tool into an L-shape in a side view thereof, because distances from the workpiece support faces through inside the horizontal machine tool to the spindle device are shortened, dimensional change generated between the workpiece support faces and the spindle device due to a heat expansion of each component is small; and it is possible to enhance the machining accuracy of a workpiece.

Furthermore, because the spindle device passes through the opening of the X-axis saddle and moves in the up-down direction and the front-rear direction in the opening, it is possible to compactly arrange the X-axis saddle, the Y-axis saddle, and the spindle device and to make the whole of the horizontal machine tool a small size.

With respect to the horizontal machine tool, it is possible to configure the tool so that: the X-axis saddle comprises a main body portion, and two protrusion portions configured to protrude upward from the main body portion and to be arranged with an interval in the left-right direction; the opening is formed between each of the two protrusion portions; and the main body portion is attached to the back-face portion of the base frame through the X-axis movement mechanism.

According to this configuration, because the X-axis movement mechanism is provided at the main body portion below the opening the X-axis movement mechanism is arranged below the spindle device, it is possible to make a center of gravity of the horizontal machine tool low and to enhance a stability of the tool.

Furthermore, because an upper portion of the opening is opened, it is possible to make the X-axis saddle lightweight and to enlarge a movement amount of the spindle device in the up-down direction.

Furthermore, when the Y-axis movement mechanism is provided on the back-face portion of the X-axis saddle from the main body portion across the each protrusion portion, it is possible to move the Y-axis saddle from an upper end of the X-axis saddle across a lower end thereof, therefore, it is possible to enlarge the movement amount of the spindle device in the up-down direction.

With respect to the horizontal machine tool, it is possible to configure the tool so that: the base frame comprises a pair of left and right side frames, and a connection frame configured to connect both of side frames; an open space opened in the up-down direction is formed; and the workpiece support faces are formed at upper portions of positions corresponding to the open space in both of side frames.

According to this configuration, by forming the open space in the base frame, it is possible to drastically make the base frame lightweight in comparison with a bed used for a conventional horizontal machine tool. Furthermore, by utilizing the open space formed in the base frame, it is possible to house a drum-type tip treatment device below an area for machining a workpiece.

Effect of the Invention

According to the horizontal machine tool of the invention, it is possible to make the base frame a small size and to make the whole of the horizontal machine tool lightweight. Furthermore, because dimensional change generated between the workpiece support faces and the spindle device due to the heat expansion of the base frame is small, it is possible to enhance the machining accuracy of a workpiece.

BEST MODE(S) FOR CARRYING OUT THE INVENTION

Next will be described an embodiment of the invention in detail in reference to FIG. 1 to FIG. 4.

(General Configuration of Horizontal Machine Tool)

A horizontal machine tool 1 of the embodiment comprises a base frame 10 where workpiece support faces 11c, 11c for supporting a workpiece (not shown) through a holding jig (not shown) are formed at a front portion; an X-axis saddle 20 attached to the base frame 10 universally slidably in a left-right direction; a Y-axis saddle 30 attached to the X-axis saddle 20 universally slidably in an up-down direction; and a spindle device 40 attached to the Y-axis saddle 30 universally slidably in a front-rear direction.

The horizontal machine tool 1 is configured to universally attach and detach various tools at a front end of a spindle 41 of the spindle device 40, to move the device 40 in three-axial directions of a left-right direction (X-axis direction), an up-down direction (Y-axis direction), and a front-rear direction (Z-axis direction), and to cut the workpiece by a tool rotated together with the spindle 41.

(Configuration of Base Frame)

The base frame 10 comprises a pair of side frames 11, 11 arranged with a predetermined interval in the left-right direction and a plate-like connection frame 12 configured to connect both of the frames 11, 11.

Both of the side frames 11, 11 are regions for supporting a whole of the horizontal machine tool 1; lower portions 11a, 11a placed on a floor face are extended in the front-rear direction; and a stability of the horizontal machine tool 1 is enhanced. Furthermore, upper portions 11b, 11b of both of the side frames 11, 11 are protruded forward. Furthermore, in front of the connection frame 12 is formed an open space 13 opened in the up-down direction; on upper-face front portions of the respective upper portions 11b, 11b of both of the side frames 11, 11, which the portions 11b, 11b correspond to the open space 13, are formed a pair of the workpiece support faces 11c, 11c for supporting a workpiece (not shown) through a holding jig (not shown).

Thus the horizontal machine tool 1 of the embodiment is configured to be a so called headless machine tool where a frame is used, wherein in the frame a space between the left and right workpiece support faces 11c, 11c is opened in the up-down direction.

(Configuration of X-Axis Saddle)

The X-axis saddle 20 is a plate-like member arranged at rear of the connection frame 12 of the base frame 10 and is attached to a back-face portion 12b of the frame 12 through an X-axis movement mechanism 50.

In an upper portion of the X-axis saddle 20 is formed an opening 22 penetrated in the front-rear direction, and the upper portion is a depression form of two protrusion portions 21, 21 with a predetermined interval in the left-right direction being protruded upward. The opening 22 is designed to be a size so that the spindle device 40 can pass therethrough.

Describing the X-axis saddle 20 in more detail, it comprises a main body portion 23 rectangular in a front view thereof and the protrusion portions 21, 21 having a rectangular section protruded upward from both of left and right, ends of an upper face 23a of the portion 23. Between the protrusion portions 21, 21, which are arranged with an interval in the left-right direction, is formed the opening 22 whose upper portion is opened. By the opening 22 being formed in the upper portion of the X-axis saddle 20, the upper portion is made to be lightweight.

(Configuration of X-Axis Movement Mechanism)

The X-axis movement mechanism 50 is a mechanism for universally slidably attaching the X-axis saddle 20 to the rear-face portion 12b of the connection frame 12 and comprises an X-axis movement guide mechanism 51 and an X-axis feed mechanism 52.

The X-axis movement guide mechanism 51 is a well known linear movement mechanism and comprises two X-axis guide rails 51a, 51a attached to the rear-face portion 12b of the connection frame 12 and a plurality of X-axis sliders 51b . . . attached to each of the rails 51a, 51a; each of the X-axis sliders 51b moves in the left-right direction along each of the rails 51a, 51a from one side frame 11 to the other side frame 11 of the base frame 10.

Each of the X-axis sliders 51b is fixed to a front-face portion 20a of the X-axis saddle 20 configured to be universally slidable in the left-right direction along each of the X-axis guide rails 51a, 51a.

The X-axis feed mechanism 52 is a well known movement mechanism by a ball screw and comprises an X-axis drive motor 52a attached to the rear-face portion 12b of the connection frame 12; an X-axis ball screw 52b connected to the motor 52a; and a nut 52c screwed with the screw 52b. The nut 52c is fixed to the X-axis saddle 20, and by rotating the X-axis ball screw 52b, the saddle 20 moves in the left-right direction along each of the X-axis guide rails 51a, 51a.

Describing the X-axis movement mechanism 50 in more detail, each of the X-axis sliders 51b . . . of the X-axis movement guide mechanism 51 and the X-axis movement mechanism 52 are provided on the front-face portion 20a of the main body portion 23 of the X-axis saddle 20. That is, with respect to the X-axis saddle 20, the front-face portion 20a of the main body portion 23 is attached to the rear-face portion 12b of the connection frame 12 of the base frame 10 through the X-axis movement mechanism 50. Then the X-axis movement mechanism 50 is arranged below the opening 22.

(Configuration of Y-Axis Saddle)

The Y-axis saddle 30 is attached to a rear-face portion 20b of the X-axis saddle 20 through a Y-axis movement mechanism 60.

With respect to the Y-axis saddle 30, at a lower portion thereof is formed a plate-like support portion 31; at an upper portion thereof is formed an extension portion 32 extended more than the support portion 31 in the front-rear direction. A front end of the extension portion 32 of the Y-axis saddle 30 is inserted in the opening 22 of the X-axis saddle 20.

(Configuration of Y-Axis Movement Mechanism)

The Y-axis movement mechanism 60 is a mechanism for attaching the Y-axis saddle 30 to the rear-face portion 20b of the X-axis saddle 20 universally slidably in the up-down direction and comprises a Y-axis movement guide mechanism 61 and a Y-axis feed mechanism 62.

The Y-axis movement guide mechanism 61 is a well known linear movement mechanism and comprises two Y-axis guide rails 61a, 61a attached to the rear-face portion 20b of the X-axis saddle 20 and a plurality of Y-axis sliders 61b . . . attached to each of the rails 61a, 61a; each of the Y-axis sliders 61b . . . moves in the up-down direction along each of the rails 61a, 61a from an upper end to lower end of the saddle 20.

Each of the Y-axis sliders 61b . . . is fixed to a front-face portion 31a of the support portion 31 of the Y-axis saddle 30 configured to be universally slidable in the up-down direction along each of the Y-axis guide rails 61a, 61a.

Specifically, each of the Y-axis guide rails 61a, 61a of the Y-axis movement guide mechanism 61 is provided on the rear-face portion of the X-axis saddle 20 from a lower end of the main body portion 23 to an upper end of each of the protrusion portions 21, 21. Thus the Y-axis saddle 30 can move in the up-down direction from the upper end to lower end of the X-axis saddle 20.

The Y-axis feed mechanism 62 is a well known movement mechanism by a ball screw and comprises a Y-axis drive motor 62a attached to an upper face of one protrusion portion 21 of the X-axis saddle 20; a Y-axis ball screw 62b connected to the motor 62a; and a nut 62c screwed with the screw 62b. The nut 62c is fixed to the Y-axis saddle 30, and by rotating the Y-axis ball screw 62b, the saddle 30 moves in the up-down direction along each of the Y-axis guide rails 61a, 61a.

(Configuration of Spindle Device)

The spindle device 40 comprises the spindle 41, whose axial direction is arranged within a spindle housing 40a in the front-rear direction, and a spindle drive motor 42; and a rear end of the spindle 41 is connected to an output/input portion of the motor 42, and various tools (not shown) are adapted to be attachable to and detachable from a front end of the spindle 41. The spindle device 40 is attached to an upper-face portion 32a of the extension portion 32 of the Y-axis saddle 30 through a Z-axis movement mechanism 70.

(Configuration of Z-Axis Movement Mechanism)

The Z-axis movement mechanism 70 is a mechanism for universally slidably attaching the spindle device 40 to the upper-face portion 32a of the extension portion 32 of the Y-axis saddle 30 and comprises a Z-axis movement guide mechanism 71 and a Z-axis feed mechanism 72.

The Z-axis movement guide mechanism 71 is a well known linear movement mechanism and comprises two Z-axis guide rails 71a, 71a attached to the upper-face portion 32a of the extension portion 32 of the Y-axis saddle 30 and a plurality of Z-axis sliders 71b . . . attached to each of the rails 71a, 71a; each of the Z-axis sliders 71b . . . can move in the front-rear direction along each of the rails 71a, 71a from an upper end to lower end of the extension portion 32.

Each of the Z-axis sliders 71b . . . is fixed to a lower face of the spindle drive motor 42 of the spindle device 40 configured to be universally slidable in the front-rear direction along each of the Z-axis guide rails 71a, 71a.

The Z-axis feed mechanism 72 is a well known movement mechanism by a ball screw and comprises a Z-axis drive motor 72a attached to a rear end of the extension portion 32 of the Y-axis saddle 30; a Z-axis ball screw 72b connected to the motor 72a; and a nut 72c screwed with the screw 72b. The nut 72c is fixed to the spindle device 40 and by rotating the Z-axis ball screw 72b, the spindle device 40 moves in the front-rear direction along each of the Z-axis guide rails 71a, 71a.

(Action and Effect of Horizontal Machine Tool)

The horizontal machine tool 1 thus configured operates as follows and brings action and effect of the invention.

According to the horizontal machine tool 1 of the embodiment, the X-axis saddle 20 is attached to the rear-face portion 12b of the connection frame 12, the Y-axis saddle 30 is attached to the rear-face portion 20b of the saddle 20, and moreover, the spindle device 40 is attached to the upper-face portion 32a of the extension portion 32 of the saddle 30.

Accordingly, the horizontal machine tool 1 of the embodiment moves the X-axis saddle 20 in the left-right direction with respect to the base frame 10; thereby, it is possible to move the spindle device 40 in the left-right direction (X-axis direction) with respect to a workpiece (not shown) supported by the workpiece support faces 11c, 11c of the frame 10. Furthermore, by moving the Y-axis saddle 30 in the up-down direction with respect to the X-axis saddle 20, it is possible to move the spindle device 40 in the up-down direction (Y-axis direction) with respect to the workpiece. Moreover, by moving the spindle device 40 in the front-rear direction with respect to the Y-axis saddle 30, it is possible to move the spindle device 40 in the front-rear direction (Z-axis direction) with respect to the workpiece.

According to the horizontal machine tool 1 of the embodiment, by providing the rear-face portion 12b of the connection frame 12 of the base frame 10 with each of the movement mechanisms 50, 60, 70 of the spindle device 40, it is possible to make the frame 10 small in the front-rear direction; therefore, it is possible to make the frame 10 a small size, and the whole of the tool 1 a small size and lightweight.

Furthermore, according to the horizontal machine tool 1 of the embodiment, the base frame 10 is made to be the small size, distances from the workpiece support faces 11c, 11c to each of the movement mechanisms 50, 60, 70 are shortened; thereby, dimensional change generated between the faces 11c, 11c and the spindle device 40 due to a heat expansion of the frame 10 is small; therefore, it is possible to enhance the machining accuracy of a workpiece.

Figure 1:
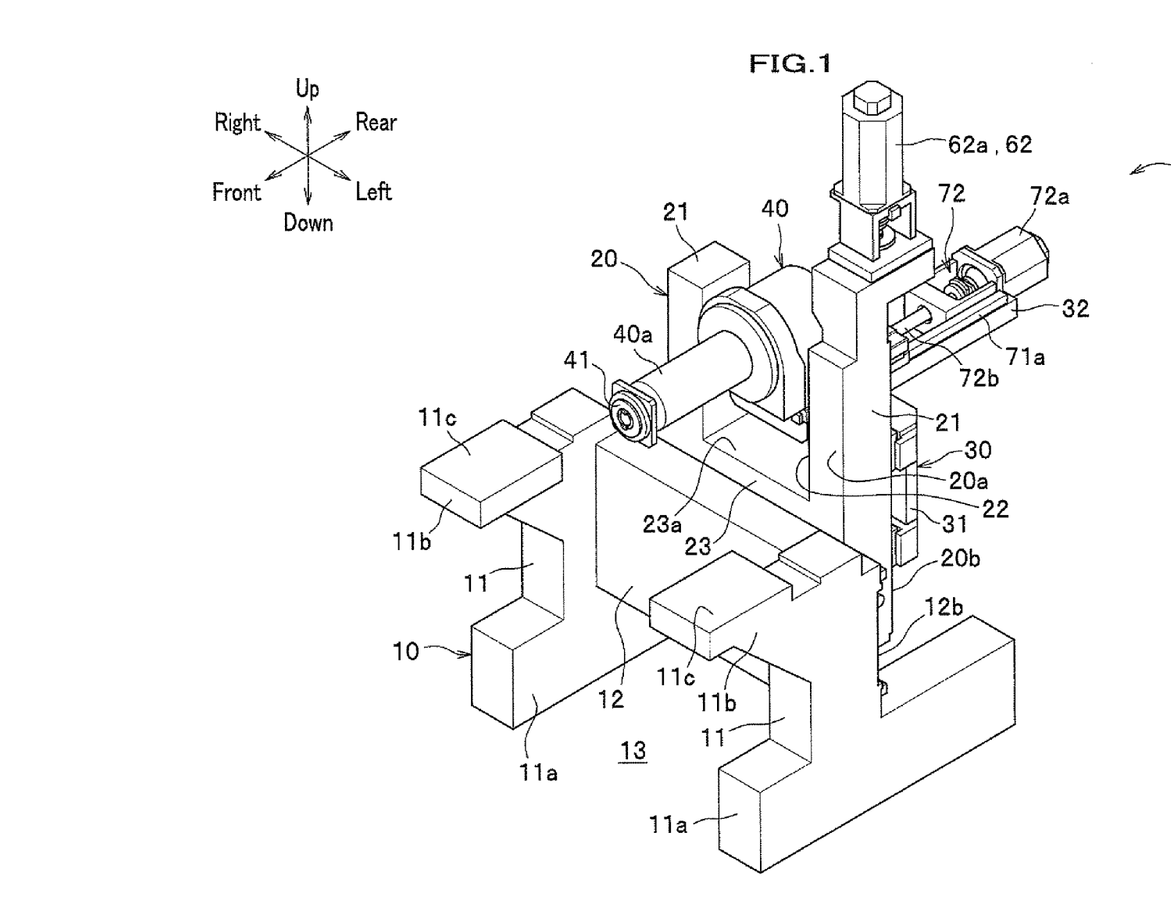
FIG. 1 is a perspective view of a horizontal machine tool seen from front in an embodiment of the invention.
Figure 2:
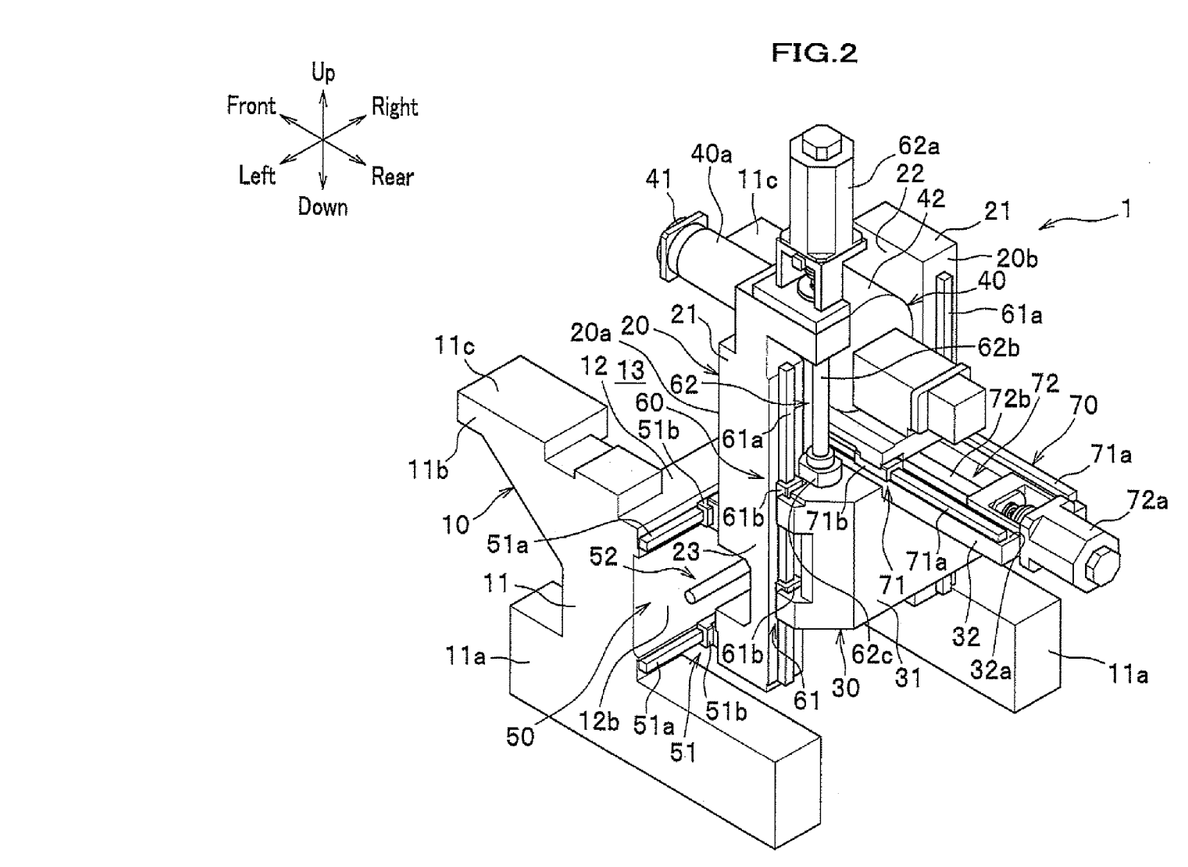
FIG. 2 is a perspective view of the horizontal machine tool seen from rear in the embodiment.
Figure 3:
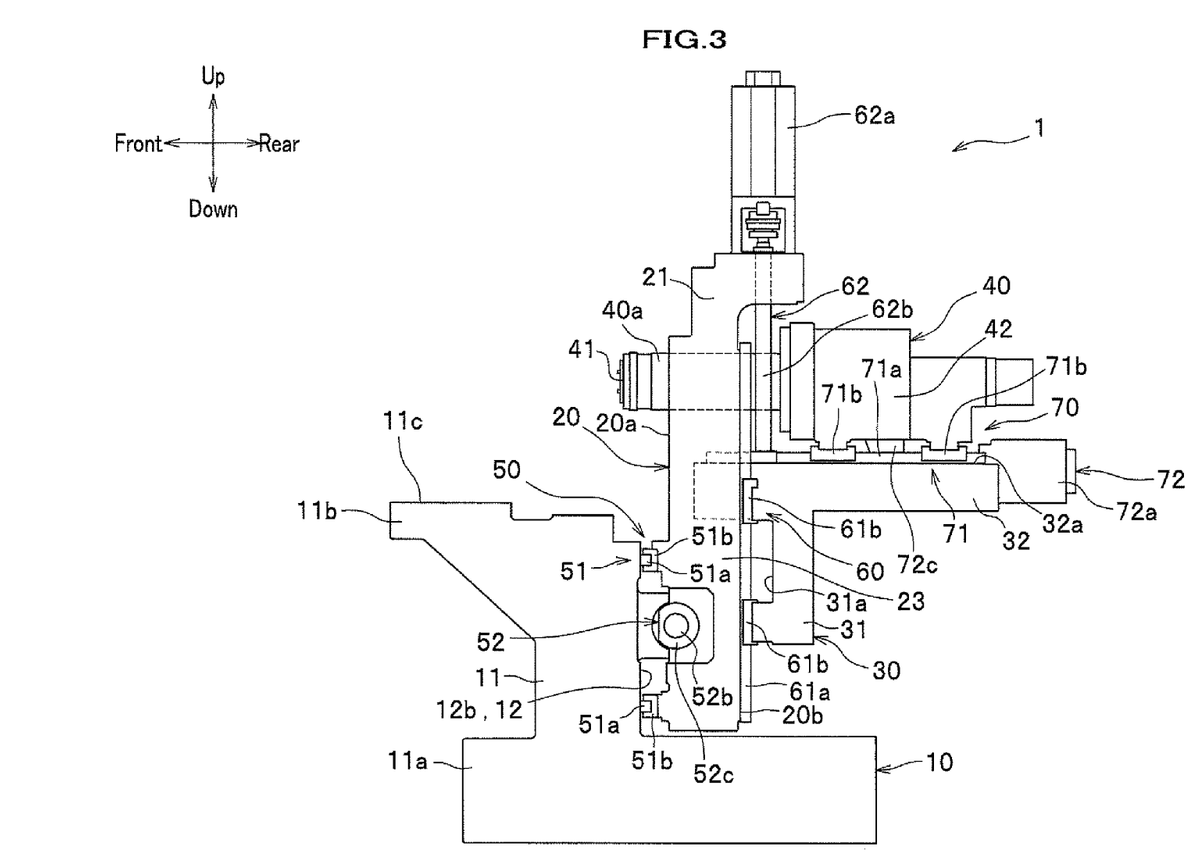
FIG. 3 is a side view showing the horizontal machine tool of the embodiment.
Figure 4:
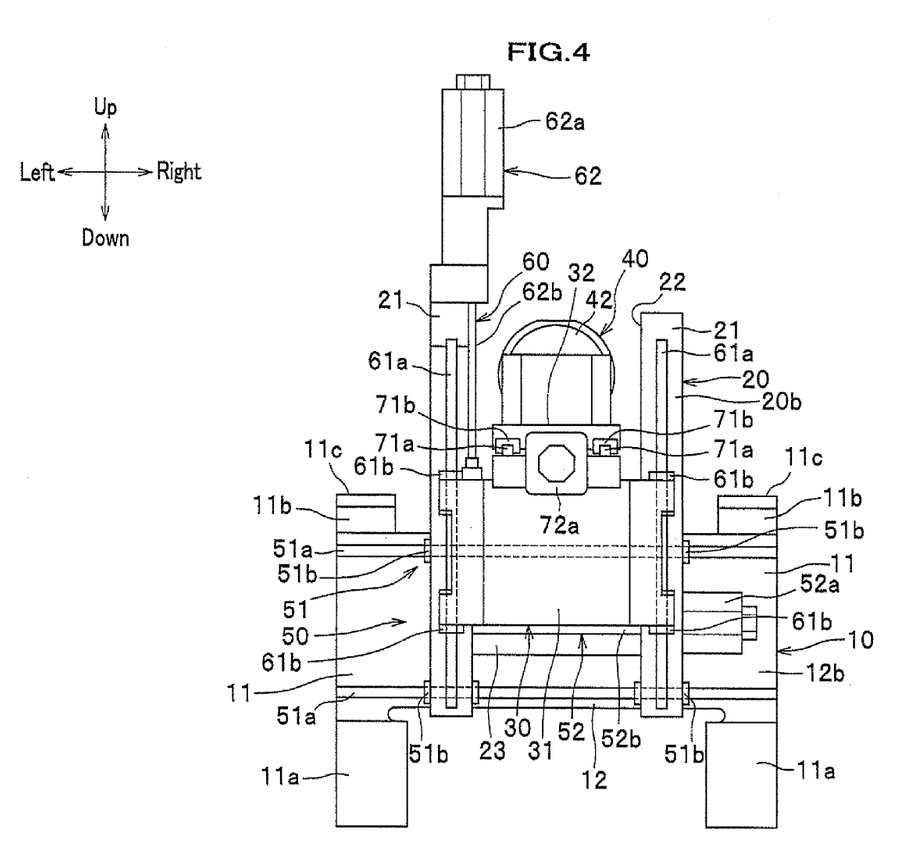
FIG. 4 is a back view showing the horizontal machine tool of the embodiment.

Furthermore, according to the horizontal machine tool 1 of the embodiment, the horizontal machine tool 1 of an L-shape in a side view thereof is configured and comprises a horizontal portion from the workpiece support faces 11c, 11c of the base frame 10 to the X-axis saddle 20, which is attached to the back-face portion 12b of the frame 10; and a vertical portion from the saddle 20 to the spindle device 40. Thus by combining the main components of the horizontal machine tool 1 into the L shape in the side view, because distances from the workpiece support faces 11c, 11c through inside the tool 1 to the spindle device 40 are shortened, it is possible to make dimensional change small, wherein the change is generated between the workpiece support faces 11c, 11c and the spindle device 40 due to a heat expansion of each component, and it is possible to enhance the machining accuracy of a workpiece.

Furthermore, the spindle device 40 passes through the opening 22 of the X-axis saddle 20 and moves in the up-down direction and the front-rear direction in the opening 22; therefore, it is possible to compactly arrange the X-axis saddle 20, the Y-axis saddle 30, and the spindle device 40 and to make the whole of the horizontal machine tool 1 a small size.

Furthermore, according to the X-axis saddle 20, the X-axis movement mechanism 50 is provided at the main body portion 23 below the opening 22. That is, because the X-axis movement mechanism 50 is arranged below the spindle device 40 moving in the opening 22, it is possible to make a center of gravity of the horizontal machine tool 1 low and to enhance a stability thereof.

Furthermore, because an upper portion of the opening 22 of the X-axis saddle 20 is opened, it is possible to make the saddle 20 a small size, and to make a movement amount of the spindle device 40 large in the up-down direction in the opening 22.

Furthermore, the Y-axis movement mechanism 60 is provided on the rear-face portion of the X-axis saddle 20 from the lower end of the main body portion 23 across the upper end of each of the protrusion portions 21, 21, and it is possible to move the Y-axis saddle 30 from the upper end of the saddle 20 across the lower end thereof, therefore, it is possible to make the movement amount of the spindle device 40 large in the up-down direction.

Furthermore, according to the horizontal machine tool 1 of the embodiment, by forming the open space 13 in the base frame 10, it is possible to drastically make the frame 10 lightweight in comparison with a bed used for a conventional horizontal machine tool. Furthermore, by utilizing the open space 13 formed in the base frame 10, it is possible to house a drum-type tip treatment device below an area for machining a workpiece.

Thus the embodiment of the invention has been described; however, the invention is not limited thereto and can be modified and changed within the spirit and scope of the invention.

For example, although a well known ball screw mechanism is used for the X-axis movement mechanism 50, Y-axis movement mechanism 60, and Z-axis movement mechanism 70 of the embodiment, those are not limited to the ball screw mechanism; a linear movement mechanism (linear motor feed mechanism) for moving a slider along a guide rail may also be used for those.

Furthermore, according to the embodiment, the X-axis saddle 20, Y-axis saddle 30, and the spindle device 40 are moved, respectively, by one X-axis feed mechanism 52, one Y-axis feed mechanism 62, and one Z-axis feed mechanism 72; those may also be moved by a plurality of the mechanisms 52, the mechanisms 62, and the mechanisms 72.

DESCRIPTION OF THE SYMBOLS

1 Horizontal Machine Tool
10 Base Frame
11c Workpiece Support Face
13 Opening Space
20 X-axis Saddle
21 Protrusion Portion
22 Opening
23 Main Body Portion
30 axis Saddle
32 Extension Portion
40 Spindle Device
41 Spindle
42 Spindle Drive Motor
50 X-axis Movement Mechanism
51 X-axis Movement Guide Mechanism
51a X-axis Guide Rail
51b X-axis Slider
52 X-axis Feed Mechanism
52a X-axis Drive Motor
60 Y-axis Movement Mechanism
61 Y-axis Movement Guide Mechanism
61a Y-axis Guide Rail
61b Y-axis Slider
62 Y-axis Feed Mechanism
62a Y-axis Drive Motor
70 Z-axis Movement Mechanism
71 Z-axis Movement Guide Mechanism
71a Z-axis Guide Rail
71b Z-axis Slider
72 Z-axis Feed Mechanism
72a Z-axis Drive Motor

What is claimed is:

1. A horizontal machine tool comprising:
a tool spindle having a horizontal longitudinal central axis extending in a front-rear direction of the machine tool, the tool spindle configured to drive a tool mounted at a front end thereof;
a base frame including a base part and a saddle supporting part vertically standing on the base part;
an X-axis saddle slidably attached to a rear face of the saddle supporting part of the base frame via guide rails of an X-axis movement mechanism so as to be slidable in a left-right direction, the left-right direction being relative to a line of sight along the horizontal longitudinal central axis of the tool spindle, a rearmost face of the saddle supporting part being spaced in the front-rear direction from a rearmost face of the base part;
a Y-axis saddle slidably attached to the X-axis saddle via a Y-axis movement mechanism so as to be slidable in an up-down direction; and
a spindle device slidably attached to the Y-axis saddle via a Z-axis movement mechanism so as to be slidable in the front-rear direction,
wherein workpiece support faces for supporting a workpiece are formed on front portions of the base frame.

2. The horizontal machine tool according to claim 1,
wherein an opening is formed in the X-axis saddle so as to penetrate the X-axis saddle in the front-rear direction,
wherein the Y-axis saddle is attached to a rear-face portion of the X-axis saddle via the Y-axis movement mechanism, and the spindle device is attached to an upper-face portion of the Y-axis saddle via the Z-axis movement mechanism, and
wherein the spindle device is configured so as to pass through the opening of the X-axis saddle and to protrude from a front of the X-axis saddle.

3. The horizontal machine tool according to claim 2, the X-axis saddle comprising:
a main body portion attached to the rear face of the saddle supporting part of the base frame via the X-axis movement mechanism; and
two protrusion portions configured to protrude upward from the main body portion and to be arranged with an interval in the left-right direction, the opening being formed between the two protrusion portions.

4. The horizontal machine tool according to claim 3, wherein the Y-axis movement mechanism is provided on the rear-face portion of the X-axis saddle so as to extend along the main body portion and each of the protrusion portions.

5. The horizontal machine tool according to claim 1, wherein the workpiece support faces are formed at upper portions the base frame.

\* \* \* \* \*